June 30, 1953    I. S. GOTTSCHO    2,643,609
HOLDER FOR RUBBER TYPE
Filed April 7, 1951
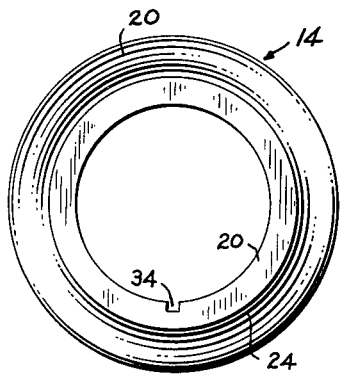
Fig. ~3~
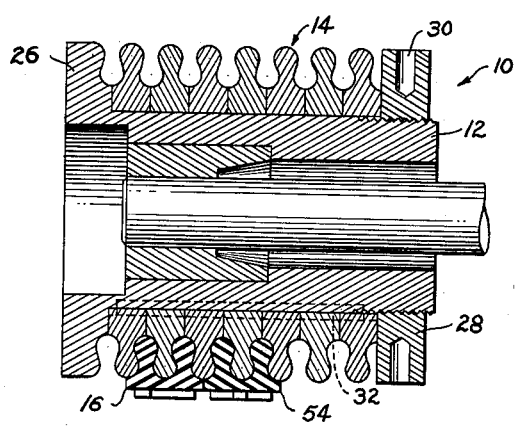
Fig. ~2~
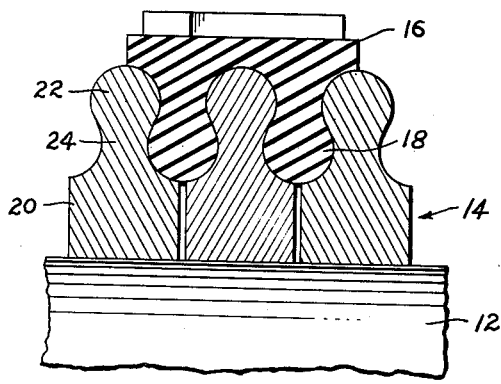
Fig. ~4~
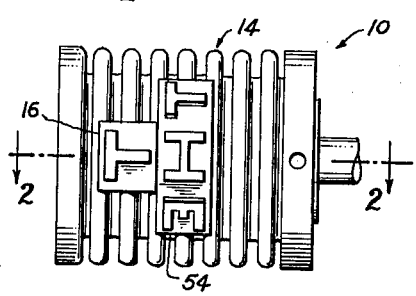
Fig. ~1~
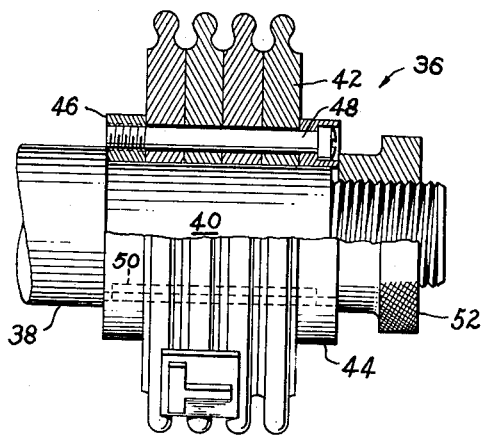
Fig. ~6~
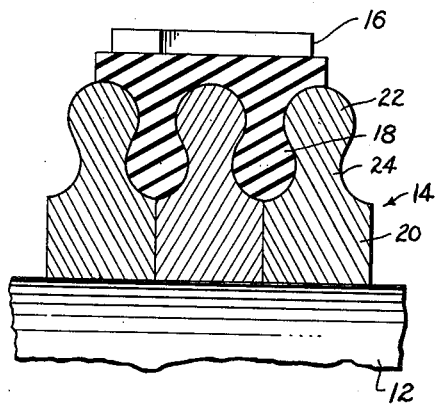
Fig. ~5~
INVENTOR.
IRA S. GOTTSCHO
BY
*Jack Montgomery*
ATTORNEY Patented June 30, 1953

2,643,609

UNITED STATES PATENT OFFICE 2,643,609

HOLDER FOR RUBBER TYPE

Ira S. Gottscho, Milburn, N. J., assignor to Adolph Gottscho, Inc., Hillside, N. J., a corporation of New York Application April 7, 1951, Serial No. 219,867

7 Claims. (Cl. 101—377)

The present invention relates to holders for rubber type and the like, and is particularly directed to cylindrical holders, such as, die wheels or printing cylinders, for supporting rubber type.

Heretofore rubber type has been resiliently held in a rubber bed having projections or tie knots corresponding in spacing and cross-sectional shape to the holding members extending from the rubber type, for example, in the manner illustrated in United States Patent No. 2,222,333. This arrangement is satisfactory in those applications where the bed is substantially flat. However, when the bed or base is applied to the curved surface of a printing cylinder or die wheel of relatively small diameter, there is a tendency for the type to become dislodged from the retaining channels. Particular difficulty has been experienced in securely holding rubber logotypes or type strips to a curved surface with the existing type bed arrangements, in which case the ends of the logotype have a tendency to pull away from the curved supporting surface.

An object of the present invention is to provide a die wheel or printing cylinder construction adapted to securely hold rubber type on the periphery thereof.

Another object resides in the provision of a die wheel or printing cylinder construction for securely holding rubber type or logotype to the surface thereof even when the diameter of the wheel or cylinder is relatively small.

Another object resides in the provision of a die wheel or printing cylinder construction of the described character which facilitates the assembly or removal of the rubber type.

A further object of the invention is to provide a holder in cylindrical form for rubber type which is constructed to prevent circumferential movement of the type relative to the holder.

According to the present invention, these objects are accomplished by providing tie knots in the form of rings or discs on a cylindrical mandrel or support to grip the projections on the rubber type bed therebetween, with means on the mandrel or support for axially compacting the rings or discs to compress the projections on the type bed for holding the latter to the curved surface with increased tenacity. In one form of the invention, the rings or discs are axially compacted between a flange on one end of the mandrel and a clamping ring threaded onto the other end portion of the mandrel, while in another embodiment of the invention the same function is performed by two clamping rings disposed at opposite sides of the tie knots and drawn together by axially extending clamping bolts.

Other objects, features and advantages of the present invention will be apparent in the following detailed description of illustrative embodiments thereof, which description is to be read in connection with the accompanying drawing forming a part hereof, and wherein:

Fig. 1 is an elevational view of a cylindrical rubber type holding device embodying the present invention, with pieces of type shown secured to the periphery thereof;

Fig. 2 is a longitudinal sectional view taken along the line 2—2 of Fig. 1, and on an enlarged scale;

Fig. 3 is an elevational view of one of the tie knot rings included in the device of Figs. 1 and 2;

Fig. 4 is a fragmentary, longitudinal sectional view of a group of tie knot rings or discs showing the condition of the parts during the attachment or removal of the rubber type;

Fig. 5 is a view similar to that of Fig. 4 but showing the rings compacted for securely holding the rubber type therebetween; and Fig. 6 is an elevational view of another embodiment of the present invention, partly broken away and partly in section.

Referring to the drawing in detail, and first to Figs. 1 and 2 thereof, a printing cylinder 10, constructed according to this invention for supporting rubber type on the curved surface thereof, is shown to include a cylindrical mandrel or support 12 having an axially arranged series of identical substantially rigid tie knot rings or discs 14, preferably formed of metal and slidable axially thereon.

As seen in Fig. 4, each piece of rubber type 16 includes similarly shaped, holding or gripping members 18 extending along the back of the bed thereof in spaced, parallel relationship. Each of the holding or gripping members 18 includes a preferably bulbous portion which is connected to the body of the type by a relatively thin web so that channels are defined between adjacent holding or gripping members to open toward the back of the type through the restricted spaces provided between the bulbous portions of the related holding members. In the illustrated embodiment, the holding or gripping members 18 are formed so that the cross-sectional shape of each channel, defined by adjacent holding members, is the inverted equivalent of the normal cross-sectional shape of each holding or gripping member.

Each tie knot ring or disc 14 (Figs. 3, 4 and 5) includes an annular base portion 20 formed with a gripping portion extending continuously along the outer periphery thereof. The gripping portion of the ring 14 includes a cross-sectionally bulbous outer section 22 and a relatively thin web 24 intermediate the bulbous section 22 to the base 20, with the bulbous outer section 22 and web 24 combining to provide a cross-sectional shape which is the same as that of each channel defined between adjacent holding members 18 of the type piece 16.

The base 20 of each tie knot ring or disc is formed with a width, in the axial direction, which is slightly less than the normal or uncompressed distance between the medial lines of adjacent gripping or holding members 18 on the type piece so that, when axial movement of the rings 14 is not restrained and the holding or gripping members 18 are interlocked with the gripping portions of the tie knot rings, the bases of the latter are axially spaced apart (Fig. 4). In this condition, the type piece 16 can readily be applied with the gripping or holding members 18 intermediate the gripping portions of the rings or discs 14, and the type piece is held to the surface of the printing cylinder 10 only by the interfitting engagement of the gripping portions of the rings or discs 14 with the resilient gripping or holding members 18. In order to more securely hold the type piece to the surface of the printing cylinder after the type gripping members 18 have been initially inserted in the manner above described between the gripping portions of the rings, as in Fig. 4, it is a feature of the present invention to provide means for axially compacting the tie knot rings 14 so that the spaces between the gripping portions thereof are narrowed and the gripping or holding members 18, accommodated in such spaces, are compressed and tightly gripped (Fig. 5).

In the embodiment of this invention illustrated in Figs. 1 and 2, the mandrel 12 is formed with a radially extending flange 26 adjacent one end and with external threads on the opposite end portion thereof to threadably receive a clamping ring 28. Suitable radial, outwardly opening bores 30 may be formed in the clamping ring 28 to receive a tool for turning the clamping ring relative to the mandrel. It is apparent that, when the clamping ring 28 is turned in one direction, the axial distance between the confronting faces of the clamping ring and the flange 26 will be decreased to force the base portions 20 of the tie knot rings 14 together and thus securely clamp the type pieces to the printing cylinder, while turning of the clamping ring in the opposite direction will increase that axial distance to relax the compressive forces acting on the holding or gripping members 18 of the type pieces, so that the latter may then be removed from the printing cylinder.

In order to prevent skewing of the type pieces, printing cylinders embodying this invention are preferably provided with means preventing rotation of the tie knot rings 14 relative to each other and to the supporting mandrel. In the device shown in Figs. 1 and 2, this purpose is adequately served by a longitudinal key or spline 32 carried by the mandrel 12 for engagement in an inwardly opening, radial notch 34 (Fig. 3) formed in the base portion of each tie knot ring or disc 14.

Referring now to Fig. 6, a die wheel or printing cylinder 36 is there illustrated to show another form of structure for effecting the axial compacting of the tie knot rings. The printing cylinder 36 includes a supporting shaft 38 formed with a portion 40 of reduced diameter, corresponding to the mandrel 12 of the embodiment first described, to carry an axially arranged series of tie knots or discs 42. While the rings or discs 42 differ in the radial width of the base portions thereof from the rings 14, heretofore described, it is to be understood that such dimensions will be varied in accordance with the special requirements of each of the many applications of this invention. In any event, each ring or disc 42 is formed with a peripheral gripping portion cooperating with the holding or gripping members of the rubber type pieces in the same manner as has been described with respect to the embodiment of Figs. 1 and 2.

Clamping rings 44 and 46 are positioned on the portion 40 of the shaft at opposite sides of the series of tie knot rings 42, and axial bolts 48 (one of which is shown in Fig. 6) extend through suitable, registered openings in the clamping ring 44 and in each of the tie knot rings 42 and are tapped into the clamping ring 46 to provide the means for axially compacting the rings 42 after the type pieces have been initially engaged. As in the first embodiment, a key 50, or other equivalent device, is preferably carried by the shaft portion 40 to engage in suitable slots or notches of the rings 42, 44 and 46 for holding such rings non-rotatable on the shaft. Finally, a retaining nut 52 is threaded onto the end portion of the shaft 38 to hold the assembled tie knot rings or discs and clamping rings axially against the shoulder formed between the reduced diameter portion 40 and the adjacent part of the shaft 38.

From the foregoing description, it will be seen that the present invention provides die wheel or printing cylinder assemblies for supporting rubber type pieces at the curved surfaces thereof in a manner so that the type pieces are gripped tenaciously with a force sufficient to prevent inadvertent removal thereof, even when logotyped, such as the piece 54 (Fig. 1), are to be supported, and further that provision is made for relaxing this gripping force so that the rubber type may be conveniently attached to, or removed from, the supporting structure.

It is to be understood that the tie knot members need not necessarily be circular in all instances. In other words, instead of being ring-like the tie knots may be in the form of sectors, the peripheries of which may be arc shaped or straight as desired, or they may be rectangular in plan or of any other desired shape, the desideratum of my invention being the provision of a plurality of parallel tie knot members carried on a support for bodily movement toward and away from each other, each being provided with a gripping portion adjacent its periphery formed with a cross-sectional shape substantially the same as the cross-sectional shape of the gripping members on the back of the type bed, whereby when the tie knot members engage the gripping members on the bed therebetween and the tie knot members moved to and held in gripping position the rubber type will be securely held in position.

While preferred embodiments have been illustrated and described, it is to be understood that the present invention is not limited to those precise embodiments, as obviously various modifications and changes may be made therein without departing from the spirit and scope of the invention.

What is claimed is:

1. In combination; rubber type having a series of like resilient gripping members extending in spaced parallel relationship from the back of the bed thereof, each of said gripping members being formed with a laterally enlarged edge portion so that adjacent gripping members define a channel therebetween opening rearwardly through a resiliently restricted space; and a holder for said rubber type comprising a support, a series of parallel extending like tie knot members carried by said support and movable transversely on the latter, each of said tie knot members being formed of a substantially rigid material and having a gripping portion formed with substantially the same cross-sectional shape as that of said channels and engageable in the latter for holding the rubber type on said support, the distance between the medial lines of said gripping portions of adjacent tie knot members, with the latter abutting, being slightly less than the normal distance between the medial lines of adjacent ones of said gripping members, and means associated with said tie knot members for transversely compacting the latter to thereby compress the gripping members of the type engaged between said gripping portions of the tie knot members so that the latter tenaciously hold said rubber type on said support.

2. In combination; rubber type having a series of like resilient gripping members extending in spaced parallel relationship from the back of the bed thereof, said gripping members being shaped to define channels opening rearwardly through resiliently restricted spaces therebetween; and a holder for said rubber type comprising a support, a series of parallel extending like tie knot members carried by said support, cooperating means on said support and on said tie knot members to prevent displacement of the latter relative to each other and relative to said support in the direction in which said tie knot members extend while permitting transverse movement of the latter, each of said tie knot members being formed of a substantially rigid material and having a gripping portion formed with substantially the same cross-sectional shape as that of said channels and engageable in the latter for holding the rubber type on said support, the distance between the medial lines of said gripping portions of adjacent tie knot members, with the latter abutting, being slightly less than the normal distance between the medial lines of adjacent gripping members on the type so that said tie knot members are spaced apart when transversely unrestrained and engaged in said channels, and means associated with said tie knot members for transversely compacting the latter to thereby compress the gripping members of the type engaged between said gripping portions of the tie knot members so that the latter tenaciously hold the rubber type on said support.

3. In combination; rubber type having a series of like resilient gripping members extending in spaced parallel relationship from the back of the bed thereof, said gripping members being formed with laterally enlarged edge portions to define channels opening rearwardly through resiliently restricted spaces therebetween; and a holder for said type comprising a cylindrical support, a series of substantially rigid, circumferentially extending tie knot rings on said support and movable axially relative to the latter, each of said tie knot rings being formed with a continuous peripheral gripping portion having substantially the same cross-sectional shape as said channels to extend into the latter and engage interlockingly with said resilient gripping members, the distance between the medial lines of said gripping portions of adjacent tie knot members, with the latter abutting, being slightly less than the normal distance between the medial lines of adjacent ones of said gripping members so that the said tie knot rings, when engaged in said channels and axially unrestrained, are spaced apart, and means associated with said tie knot rings for axially compacting the latter to thereby compress gripping members disposed between said gripping portions of the rings so that the latter tenaciously hold the type on said holder.

4. The combination according to claim 3, wherein said means for axially compacting the tie knot rings includes a radial flange on one end of said cylindrical support and a clamping ring threaded on the other end portion of said support so that rotation of said clamping ring in one direction reduces the axial distance between the confronting faces of said flange and clamping ring to thereby compact said tie knot rings between said faces.

5. The combination according to claim 3, wherein said means for axially compacting the tie knot rings includes a pair of clamping rings on said cylindrical support at opposite sides of said series of tie knot rings, and axial bolts extending through said tie knot rings and said clamping rings for drawing the latter axially together.

6. The combination according to claim 3, including cooperating means on said cylindrical support and on said tie knot rings for preventing rotational movement of the latter relative to each other and relative to said cylindrical support.

7. The combination according to claim 3, wherein said cooperating means includes an axially extending key carried by said cylindrical support, and suitably shaped radial notches formed in said tie knot rings to receive said key.

IRA S. GOTTSCHO.

References Cited in the file of this patent

UNITED STATES PATENTS

| Number | Name | Date |
|---|---|---|
| 1,102,104 | Stiberg | June 30, 1914 |
| 1,514,109 | Stenstrom | Nov. 24, 1924 |
| 2,222,333 | Wenzel et al. | Nov. 19, 1940 |